United States Patent
Desprez-Le Goarant et al.

(10) Patent No.: US 6,888,575 B1
(45) Date of Patent: May 3, 2005

(54) DIGITAL CUT-OFF CONTROL LOOP FOR TV USING SPEEDING AND BLANKING CIRCUITS

(75) Inventors: Yann Desprez-Le Goarant, Singapore (SG); Jean-Luc Jaffard, Singapore (SG); Christian Michon, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 0 days.

(21) Appl. No.: 09/787,977
(22) PCT Filed: Sep. 25, 1998
(86) PCT No.: PCT/SG98/00076
§ 371 (c)(1),
(2), (4) Date: Jun. 11, 2001
(87) PCT Pub. No.: WO00/19727
PCT Pub. Date: Apr. 6, 2000

(51) Int. Cl.[7] .............................. H04N 5/16; H04N 5/68
(52) U.S. Cl. ....................... 348/379; 348/377; 348/380; 348/697; 315/383
(58) Field of Search ............................. 348/379, 377, 348/380, 695, 697, 689, 678, 679, 692; 315/383, 382.1, 379; 345/690, 11, 18

(56) References Cited

U.S. PATENT DOCUMENTS

| | | | |
|---|---|---|---|
| 4,506,292 A | * 3/1985 | Newton et al. | 348/692 |
| 4,689,665 A | 8/1987 | Johannes et al. | 358/27 |
| 4,922,328 A | * 5/1990 | Engel et al. | 348/180 |
| 5,339,011 A | 8/1994 | Tamura et al. | 315/383 |
| 5,892,337 A | * 4/1999 | Van Den Broeke | 315/383 |
| 6,069,660 A | * 5/2000 | Sato | 348/379 |
| 6,097,445 A | * 8/2000 | Goto et al. | 348/655 |

OTHER PUBLICATIONS

Michael J. Gay, "Digitally Controlled Video Processor With Accurate Grey–Scale," *IEEE Transactions on Consumer Electronics* 38(2):91–100, May 1, 1992.

Patrick Douziech et al., "A Large–Bandwidth VideoProcessor For High Definition and Double–Scan TV Sets," *IEEE Transactions on Consumer Electronics* 37(4):928–931, Nov. 1, 1991.

* cited by examiner

*Primary Examiner*—Jean Wicel Desir
(74) *Attorney, Agent, or Firm*—Lisa K. Jorgenson; E. Russell Tarleton; Seed IP Law Group PLLC

(57) ABSTRACT

An improved digital cut-off control loop for black level adjustment in a video processor for controlling RGB output signals. The improved circuit advantageously provides a higher resolution of the black level adjustment, and a short cut-off convergence time when the TV set is switched on. The improved circuit can also blank the RGB output when the cut-off control loop has not converged to the correct level.

18 Claims, 5 Drawing Sheets

Fig 2: Waveforms at the RGB outputs and Icath input during the cut-off measurements lines Fig 3: Waveforms at the RGB outputs during warm-up detection mode

DIGITAL CUT-OFF CONTROL LOOP FOR TV USING SPEEDING AND BLANKING CIRCUITS

FIELD OF THE INVENTION

This invention relates to a television/video display control circuit, and in particular to a cut-off control circuit for use in a television RGB controller.

BACKGROUND OF THE INVENTION

A cut-off control loop circuit in a television permits the automatic control of the cut-off point of the three RGB cathodes. The black level of the RGB signals is automatically adjusted to have the same cut-off current on each of the RGB cathodes, in order to have the proper DC level at each RGB cathode, for a correct colorimetry of low light level signals. The RGB cathode currents are sequentially measured at the output of the external video amplifier during the three cut-off lines. A conventional 8-bit digital cut-off control loop has low resolution of the black level adjustment requires a relatively long time to reach cut-off stability when the TV set is switched on, and cannot blank the RGB output when the cut-off control loop is not stable. To increase the resolution to 9-bits leads to even longer convergence times of the cut-off loops.

SUMMARY OF THE INVENTION

The present invention aims to address some of the difficulties associated with the prior art, and embodiments of the invention are able to provide an increased resolution of black level adjustment whilst having a short cut-off convergence time during initialisation and enabling blanking of the RGB outputs when the cut-off control loop does not converge to the correct level.

In accordance with the present invention, there is provided an RGB control circuit for use in television/video display control, comprising: a display driver current sensor; a counter circuit and analog output circuit coupled to control the display driver current; a speeding comparator having a plurality of comparator circuits coupled in parallel with the display driver current sensor as input, for determining and outputting a measure of the difference between the sensed display driver current and a predetermined value thereof; and a speeding logic circuit coupled to the speeding comparator and counter circuit, and arranged to control the up/down counting rate of the counter circuit according to said measure of difference in display driver current.

The speeding logic circuit may be arranged to control the counting rate of the counter circuit, and thus the display driver current, based on the output of the speeding comparator so as to efficiently converge the display driver current to the predetermined value.

Preferably the speeding logic circuit produces a RGB output blanking signal whilst said display driver current is substantially different from said predetermined value. Preferably control circuits are provided for each of the colour (RGB) channels, wherein the speeding logic circuit produces the RGB output blanking signal based on the counting rate of any and/or each of the counter circuits for the colour channels.

Preferably the speeding comparator has a plurality of outputs including a convergent output and at least one upper output and lower output, wherein the convergent output corresponds to the display driver current being substantially equal to the predetermined value and the upper and lower outputs are utilised by the speeding logic circuit to determine the up/down counting rate of the counter circuit. In an preferred embodiment, each of the upper and lower outputs correspond to respective up and down binary counting rates for the counter circuit.

BRIEF DESCRIPTION OF THE DRAWINGS

The invention is described in greater detail hereinafter, by way of example only, with reference to the accompanying drawings, wherein.

DETAILED DESCRIPTION

Figure 1:
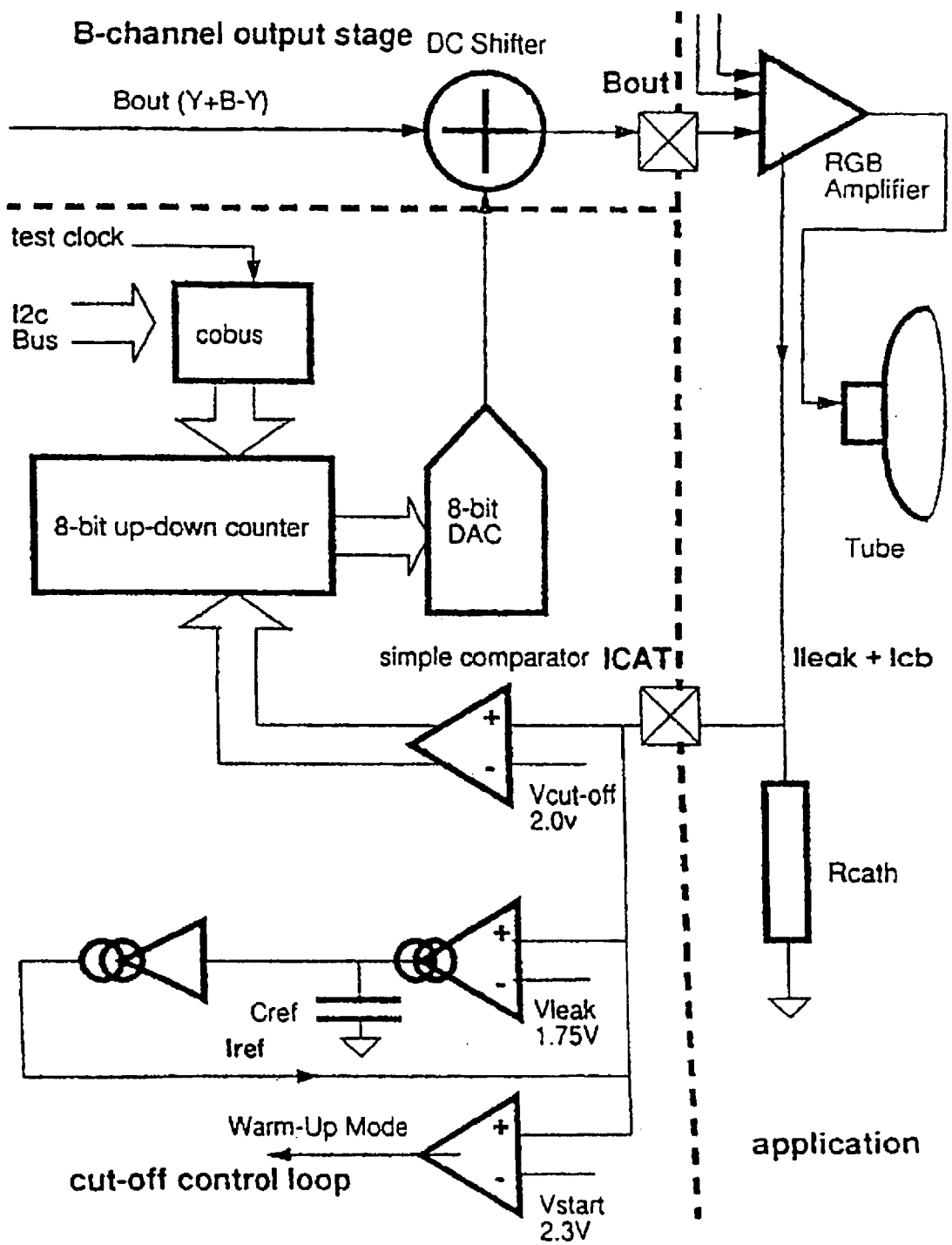
FIG. 1 is a block diagram of a conventional 8-bit digital cut-off control loop for one channel of an RGB output controller.

A conventional 8-bit digital cut-off control loop circuit is shown in block diagram form in FIG. 1. In the drawing, only the BLUE channel circuitry is shown, the for which the red and green channels are the same. The cut-off control loop permits the automatic control of the cut-off point of the three RGB cathodes. The black level of the RGB signals is automatically adjusted to have the same cut-off current on each of the RGB cathodes. The RGB cathode currents sequentially measured at the output of the external video amplifier during the three cut-off lines.

During the frame blanking pulse, the RGB outputs are blanked the total cathodes leakage current Ileak is measured. The cathode current is input to the circuit at ICAT. An external measurements resistor Rcath is connected between the pin ICAT and the ground. During the leakage current measurement the circuit provides a controlled current Iref so that the total current (Iref+Ileak) through the external resistor Rcath reaches the reference leakage voltage Vleak, where:

$$Vleak = (Iref + Ileak) * Rcath$$

The maximum controlled current Iref that the circuit can provide is 200 uA, and it is memorized by use of an internal capacitor Cref. The leakage reference voltage Vleak is 1.75V.

Figure 2:
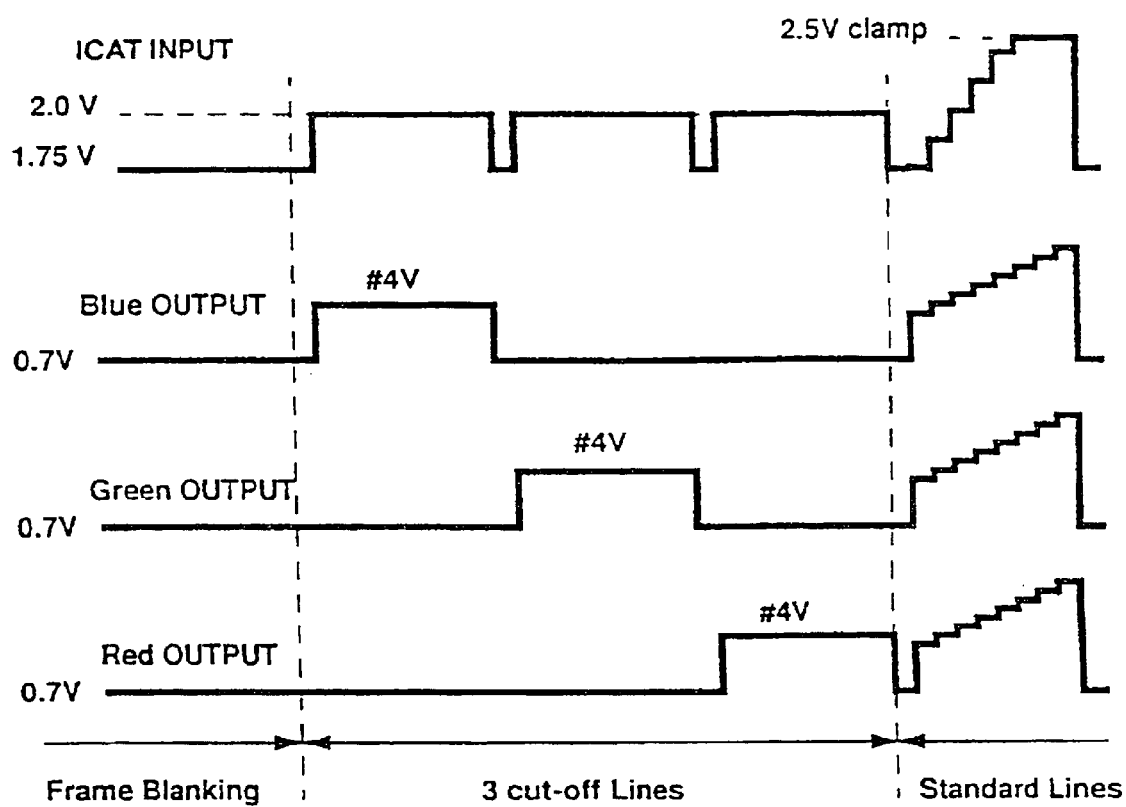
FIGS. 2 and 3 are waveform diagrams.

The cut-off current measurement is sequentially achieved for the channels during the three lines after the frame blanking (cut-off lines), as is illustrated in FIG. 2. During the first cut-off line, a reference voltage is inserted on the blue channel output, the green and the red outputs are blanked. The total cathode current is the leakage current (previously measured) plus the blue cut-off current Icb is then present. If the voltage on the ICAT pin is not equal to the cut-off reference voltage (Vcut-off), the simple comparator will give an up or down signal to the 8-bit up-down counter so that the output current of the 8-bit DAC will automatically change until the voltage on the ICAT pin is equal to Vcut-off. Thus the circuit can adjusted automatically the black-level so that the voltage on the ICAT pin is equal to cut-off reference voltage (Vcut-off), wherein:

$$Vcut\text{-}off = (Iref + Ileak + Icb) * Rcath$$

The black level is memorized using the 8-bit up-down counter and the 8-bit DAC. The blue cut-off current is determined by the resistor Rcath, such that:

$$Icb=(Vcut\text{-}off-Vleak)/Rcath$$

The second cut-off line is used for the green channel cut-off adjustment (red and blue outputs are blanked) and the same manner as described above, and the last cut-off line is dedicated to the red channel cut-off adjustment (with blue and green outputs blanked). The cut-off control loop can adjust the black level in a range of 2V.

Figure 3:
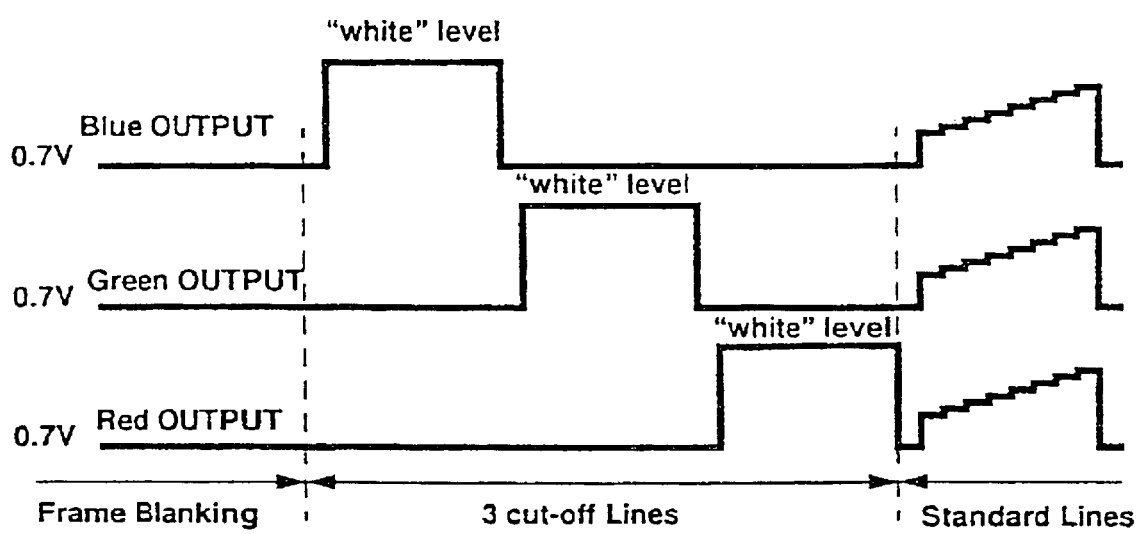

The beam current during the scanning can be relatively high, and in order to avoid high voltage on the ICAT pin, a clamping circuit will clamp the ICAT voltage to 2.5V. At the time of start-up, the circuit is in a warm-up detection mode, with waveforms similar to that illustrated in FIG. 3. When the TV set is switched on, the cut-off control loop is not active, and during the three cut-off lines a white level is inserted on the RGB outputs in order to avoid a white flash on the screen at the start. As soon as the start beam current Istart is detected on the ICAT pin, the cut-off control loop becomes active and the cut-off levels are inserted during the three cut-off lines, where:

$$Istart=(Vstart-Vleak)/Rcath\ Vstart=2.3V$$

The sensing of the start beam current is achieved during a small window at the middle of the cut-off lines.

Conventional cutoff control loop circuits of the type described above and illustrated in FIG. 1 have a number of drawbacks, some of which are summarised below:

1) Low resolution of the black level adjustment.
   Generally, the range of the black level adjustment is about 2V. Since there is total 256 steps for the 8-bit DAC, the resolution of the black level adjustment is equal to 2/256=8 mV.
2) Long cut-off convergence time when the TV set is switched on.
   In a worst case, 256 steps are required for the conventional cut-off loop circuit to reach a stable state. Since the conventional circuit works at the frame frequency, the time that must be allowed for the loop circuit to reach its convergence point is about 256*1/50=5 seconds (assuming a frame frequency equal to 50 HZ).
3) No RGB output blanking is provided when the cut-off control loop is not stable.
   When the cut-off control loop is not stable, the conventional circuit does not blank the RGB output. In this instance, the picture on the screen is not stable, and the colour may change. Pictures with strong colorimetry errors can therefore result.

Figure 4:
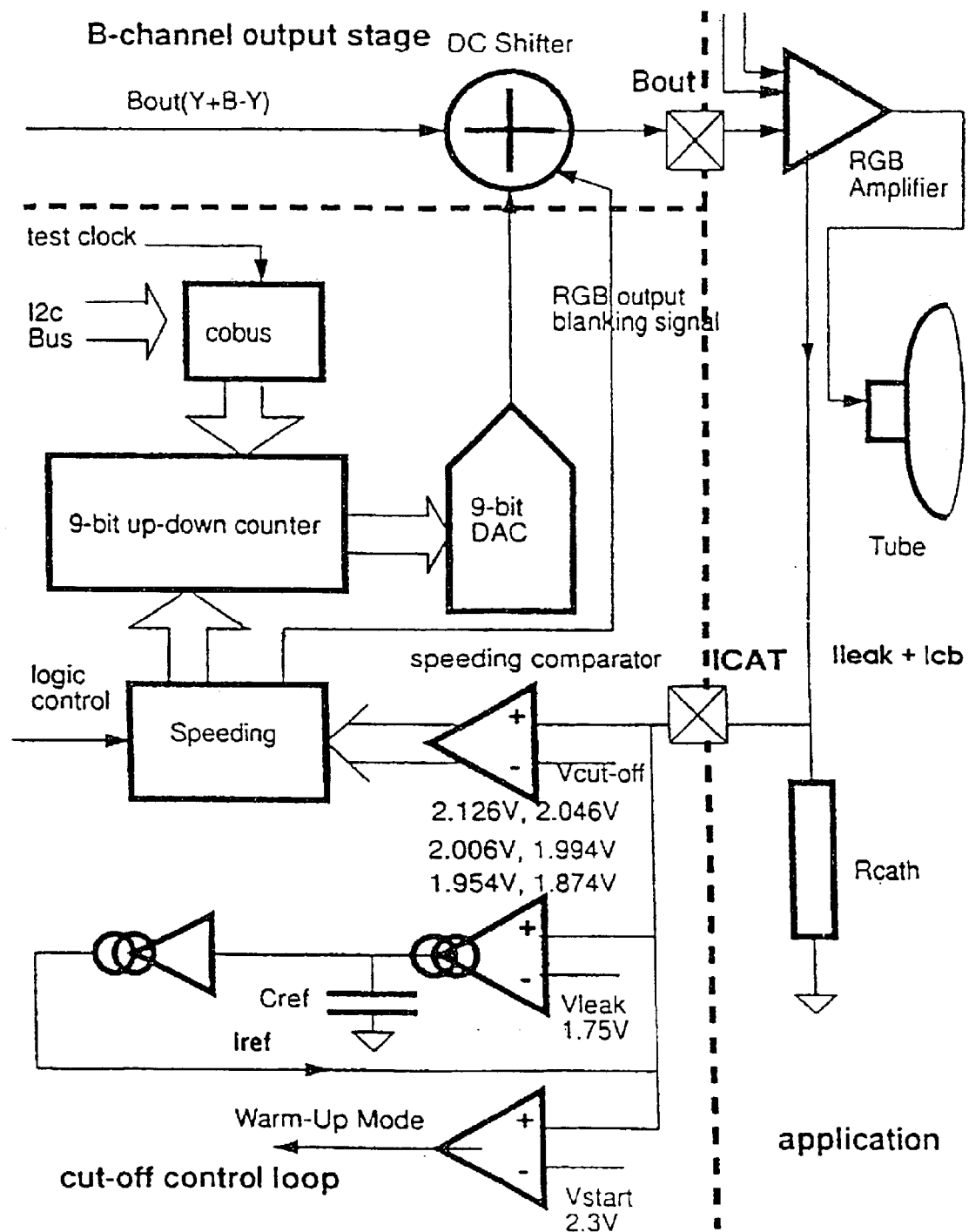
FIG. 4 is a block diagram of a digital cut-off control loop for one channel of an RGB output controller, in accordance with a preferred embodiment of the present invention.

FIG. 4 is a block diagram of a digital cut-off control loop circuit for one channel of an RGB output controller, in accordance with a preferred embodiment of the present invention. Once again, in the drawing, only the BLUE channel circuitry is shown, and the red and green channel circuits will in practice be essentially the same. The circuit includes a number of improvements over the conventional cut-off control loop circuit described above, and some of the improved features are discussed hereinbelow:

1) The simple comparator is replaced by a set of comparators (speeding comparator), indicating how far the loop is from a stable solution.
2) An additional speeding circuit is included which can generate the RGB output blanking signal while the cut-off control loop is not stable.
3) The 8-bit up-down counter is replaced by the 9-bit up-down counter.
4) The 8-bit DAC is replaced by the 9-bit DAC.

The working principle of the improved circuit is quite similar to the above described conventional circuit, however the relatively simple additional features provide very advantageous effects in overcoming or reducing the problems discussed above. The improved circuit uses a 9-bit up-down counter and a 9-bit DAC to replace the 8-bit up-down counter and the 8-bit DAC of the conventional circuit, in order to increase the resolution of the black level adjustment. Ordinarily this would result in an even longer convergence time for the loop circuit to determine a stable cut-off voltage. However, the improved circuit also employs a speeding comparator in place of the simple comparator of the prior art, and adds a speeding block to reduce the time required to reach stability when the TV set is switched on.

The speeding comparator, comprises of six parallel comparators arranged with different comparison voltages spread over an operative range. The output of the speeding comparator is fed to a speeding logic circuit which is interposed between the comparator and the up-down counter. The combination of speeding comparator and logic circuit are used to reduce the convergence time of the cut-off control loop circuit. The speeding comparator produces an output which is dependent upon the level of the ICAT voltage within the operative range.

Based on the speeding comparator output, the speeding logic circuit produces an output to the up-down counter to vary the output thereof up or down. Depending upon how far away from the stable voltage the circuit is, as indicated by the speeding comparator output, the logic circuit instructs the counter to increase or decrease by a greater or lesser amount. The combined function of the speeding comparator and logic circuit is best illustrated in Table 1, presented below.

If the voltage on the ICAT pin is far away from 2V, that means the cut-off control loop is not stable, and the speeding comparator and the speeding logic circuit will therefore produce a signal to the 9-bit up-down counter to increase or decrease the output current of the cut-off control loop at 4-times the standard speed. This enables the improved cut-off control loop circuit to reach stability in a greatly reduced time, despite using a higher resolution counter and DAC. In order to avoid the need to increase the clock, the speeding is obtained by modifying the bits LSB+1 or LSB+2 of the Up/Down counter.

The speeding logic circuit also produces a RGB output blanking signal to blank the RGB output. RGB output blanking bypasses the counter and DAC portion of the loop circuit to blank the RGB output when the cut-off control loop is not stable. The stability of the cut-off control loop is judged by the speeding logic circuit on the basis of the speeding comparator output, as discussed above. Thus, the improved circuit will blank the RGB output whilst the cut-off control loop is unstable, so the picture on the screen is not seen, which is better for TV set. This is done again, using the outputs of the comparators, as an indication of how close or far from convergence the loop is. As this information is only available during the cut-off lines, it is needed to memorize the blanking status, until the next operation of the loop.

In the improved circuit the speeding logic circuit operates to blank the RGB output if any of the three RGB channels has its cut-off loop operating at the highest counting speed (+/−4 bits). This is a compromise between providing blanking until all 3 channels have converged (but a long blanking time), and a short blanking time (but the display of pictures with still some colorimetry errors).

Since the 8-bit DAC of the conventional circuit is replaced by a 9-bit DAC, the resolution of the black level adjustment is increased. Generally, the range of the black level adjustment is about 2V, and since, in the improved circuit, there is a total of 512 steps for the 9-bit DAC, the resolution of the resulting black level adjustment is 2/512=4 mV. In worst case, when the TV set is switched on it requires 512 steps for the cut-off control loop circuit to reach a stable stare. Since the cut-off control loop works at the frame frequency, the worst case stability time is therefore about 512*1/50/4=2.5 seconds. Without the speeding circuit, the worst case stability time would be 10 seconds, which is considered too long for the user.

TABLE 1

The function of the speeding comparator and speeding circuit

| Icat input voltage (V) | Output of the Speeding Circuit |
|---|---|
| >2.126 | down 4 bits |
| 2.046–2.126 | down 2 bits |
| 2.006–2.046 | down 1 bit |
| 1.994–2.006 | stable |
| 1.954–1.994 | up 1 bit |
| 1.874–1.954 | up 2 bits |
| <1.874 | up 4 bits |

The stable output represent a "dead zone" in order to avoid digital oscillation of the outputs, and is chosen so that at least 1 step falls inside this voltage range.

Figure 5:
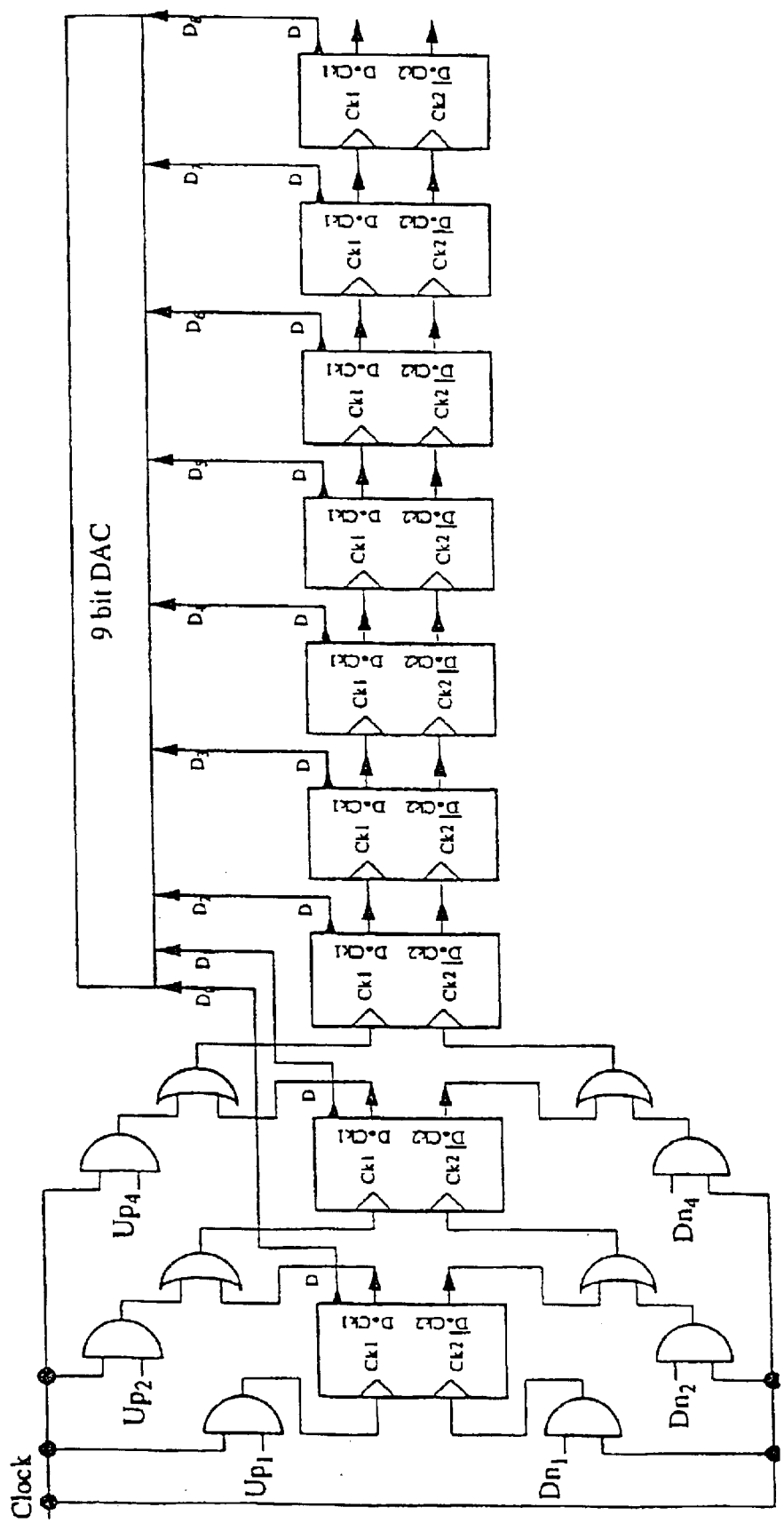
FIG. 5 is a schematic block diagram of an implementation of speeding logic and up/down counter circuitry according to an embodiment of the invention.

An exemplary implementation of the speeding logic and up/down counter circuitry is shown in schematic block diagram form in FIG. 5, and the operation of the circuit is described hereinbelow and contrasted with the form of counter employed in the prior art applications. The circuit shown in FIG. 5 includes nine counter cells which provide respective D outputs ($D_0, D_1, \ldots, D_8$) to the 9-bit DAC. In the prior art, eight cells are employed and coupled in a serial arrangement with two clocks (Ck1 for counting up and Ck2 for counting down) provided as input to the least-significant-bit cell. The cells in the improved circuit illustrated in FIG. 5 is arranged in a generally similar construction, although including nine cells as previously mentioned, and speeding logic circuitry in the form of a collection of logic gates coupled amongst the three least-significant-bit cells.

In the prior art, two clocks are provided, one for counting up and another for counting down. For counting up, the clock Ck1 is propagated as input through the counter cells on high levels (D=1), until the first low level (included). For example, for a cell A, with input $Ck1_A$ and a previous cell (A−1), with output $D_{(A-1)}$, and input $Ck1_{(A-1)}$, the following logic equation arises: $Ck1_A = Ck1_{(A-1)}$ AND $D_{(A-1)}$. An example of this counter function is expressed in the table below:

| | $b_0$ | $b_1$ | | | | | | $b_n$ |
|---|---|---|---|---|---|---|---|---|
| Counter value: | 1 | 1 | ... | 1 | 0 | X | X | X | X |
| Clock: | C | C | ... | C | C | 0 | 0 | 0 | 0 |
| On Ck1 (in) counter becomes: | 0 | 0 | ... | 0 | 1 | X | X | X | X |

All the bits where Ck1 propagation was allowed (bits with C flag), are flipped on, creating here a +1 case. Bits with status X are unchanged.

For counting down in the prior art construction, the clock Ck2 is propagated as input through the counter cells on low levels (D=0), until the first high level (included). For example, for a cell A, with input Ck2, and a previous cell (A−1), with output $D_{(A-1)}$ and input $Ck2_{(A-1)}$, the following logic equation arises: $Ck2_A = Ck2_{(A-1)}$ AND $D_{(A-1)}$. An example of this counter function is expressed in the table below:

| | $b_0$ | $b_1$ | | | | | | $b_n$ |
|---|---|---|---|---|---|---|---|---|
| Counter value: | 0 | 0 | ... | 0 | 1 | X | X | X | X |
| Clock: | C | C | ... | C | C | 0 | 0 | 0 | 0 |
| On Ck2 (in) counter becomes: | 1 | 1 | ... | 1 | 0 | X | X | X | X |

All the bits where Ck2 propagation was allowed (bits with C flag), are flipped, creating here a −1 case. Bits with status X are unchanged.

For the improved speeding counter circuit of FIG. 5, three up/down counting speeds are provided. To achieve this, the clock is applied at the CkX (X=1 or 2) clock input, of cell 0 (count +/−1 for speed 1), cell 1 (count +/−2 for speed 2), or cell 2 (count +/−4 for speed 4), depending of the result of the speeding comparators. A set of memory cells, 1 per comparator (not represented in the diagram) will stabilize the status before the clock pulse, in order to avoid a double clock generated by change of status during the clock pulse.

Referring to Table 1 above, the following signals can be derived from the speeding comparator outputs:

$Up_1$="up 1 bit"

$Up_2$="up 2 bits"

$Up_4$="up 4 bits"

$Dn_1$="down 1 bit"

$Dn_2$="down 2 bits"

$Dn_4$="down 4 bits."

In order to achieve the multiple speed counting, the following logic equations can be utilised:

$Ck1_0$=Clock AND $Up_0$ $Ck1_1$=(Clock AND $Up_2$) OR ($D_1$ AND $Ck1_0$)

$Ck1_2$=(Clock AND $Up_4$) OR ($D_2$ AND $Ck1_1$)

$Ck2_0$=Clock AND $Dn_0$ $Ck2_1$=(Clock AND $Dn_2$) OR (NOT ($D_1$) AND $Ck2_0$)

$Ck2_2$=(Clock AND $Dn_4$) OR (NOT ($D_1$) AND $Ck2_1$).

These logic expressions are implemented in the speeding logic circuitry coupled to the counter cells illustrated in FIG. 5.

An example of the counter Function of the speeding counter as shown, for the case of counting up by increments of 4, is expressed in the table below:

| | $b_0$ | $b_1$ | $b_2$ | | | | | | $b_n$ |
|---|---|---|---|---|---|---|---|---|---|
| Counter value: | X | X | 1 | ... | 1 | 0 | X | X | X | X |
| Clock: | 0 | 0 | C | ... | C | C | 0 | 0 | 0 | 0 |
| On Ck1 (in) counter becomes: | X | X | 0 | ... | 0 | 1 | X | X | X | X |

Where "X" states are unchanged, and the clock propagation is indicated as "C".

Another example of the counter function of the speeding counter as shown, for the case of counting down by increments of 2, is expressed in the table below:

|  | $b_0$ | $b_1$ |  |  |  |  |  | $b_n$ |
|---|---|---|---|---|---|---|---|---|
| Counter value: | X | 0 | ... | 0 | 1 | X | X | X | X |
| Clock: | 0 | C | ... | C | C | 0 | 0 | 0 | 0 |
| On Ck2 (in) counter becomes: | X | 1 | ... | 1 | 0 | X | X | X | X |

The improved cut-off control loop circuit described hereinabove can be advantageously implemented in an integrated circuit for inclusion in TV/video RGB control circuitry, and the actual design of the circuit components will be readily ascertainable by those skilled in the art from the foregoing functional description and accompanying drawings. It will be appreciated that the improved circuit can be extended to higher bit count, or increased number of comparators for even higher counting speeds or different values of the comparators. The limitation of higher bit count then is the complexity of the DAC, which needs to be monotonous for this application.

The foregoing detailed description of the present invention has been presented by way of example only, and is not intended to be considered limiting to the invention as defined in the accompanying claims. For example, the numerical quantitites presented herein such as the 2.0 volt cut-off reference voltage and the 1.75 volt leakage reference voltage, whilst valid for the embodiment described and illustrated, do not limit the present invention to those values, and the principles and structures of the invention can equally be adapted to applications with different voltages and using different valued components.

What is claimed is:

1. An RGB control circuit for use in television/video display control, comprising:
    a display driver current sensor;
    a counter circuit and analog output circuit coupled to control the display driver current;
    a speeding comparator having a plurality of sets of comparator circuits coupled in parallel with the display driver current sensor as input, for determining and outputting a measure of the difference between the sensed display driver current and a predetermined value thereof; and
    a speeding logic circuit having an input coupled to an output of the speeding comparator and further having an output coupled to an input of the counter circuit, and arranged to control the counting rate of the counter circuit according to said measure of difference in display driver current to provide a variable up counting rate and a variable down counting rate.

2. The RGB control circuit of claim 1, wherein the speeding logic circuit is arranged to control the counting rate of the counter circuit, and thus the display driver current, based on the output of the speeding comparator so as to converge the display driver current to said predetermined value.

3. The RGB control circuit of claim 2, wherein said speeding logic circuit produces a RGB output blanking signal whilst said display driver current is substantially different from said predetermined value.

4. The RGB control circuit of claim 3, including control circuits for each of the colour channels, and wherein said speeding logic circuit produces said RGB output blanking signal based on the counting rate of any and/or each of the counter circuits for the colour channels.

5. The RGB control circuit of claim 1, wherein the speeding comparator 30 has a plurality of outputs including a convergent output and at least one upper output and lower output, and wherein said convergent output corresponds to said display driver current being substantially equal to said predetermined value and said upper and lower outputs are utilised by said speeding logic circuit to determine the up/down counting rate of the counter circuit.

6. The RGB control circuit of claim 5, wherein each of said upper and lower outputs correspond to respective up and down binary counting rates for said counter circuit.

7. The RGB control circuit of claim 1, wherein the counter circuit and the analog output circuit are both 9-bit circuits.

8. The RGB control circuit of claim 1, further comprising a current reference circuit comprising a comparator coupled to the display driver current sensor and to a capacitor.

9. The RGB control circuit of claim 1, further comprising a warm-up circuit comprising a comparator having a first input coupled to the display driver current sensor and a second input coupled to a starting voltage source.

10. An RGB control circuit for use in television and video display control, comprising:
    an up/down counter circuit configured to receive a display driver current and to generate a digital output signal in response thereto;
    a digital-to-analog converter having an input coupled to an output of the counter circuit and configured to receive the digital output signal from the counter circuit and to output an analog control signal;
    a speeding comparator circuit comprising a plurality of comparators, each comparator having an input coupled in parallel with the other comparator circuits to a cathode current output for determining and outputting a measure of a difference between the cathode current output and a predetermined value; and
    a speeding logic circuit having an input coupled to an output of the speeding comparator circuit and further having a first output coupled to the counter circuit, the speeding logic circuit configured to control the counting rate of the counter circuit according to a measure of a difference between the cathode current and the predetermined value to provide a variable up counting rate and a variable down counting rate.

11. The circuit of claim 10, wherein the speeding logic circuit comprises a second output on which is generated an RGB output blanking signal to blank the RGB output when the control circuit is unstable as determined by the output of the speeding comparator.

12. The circuit of claim 10, wherein the speeding logic circuit is configured to control a counting rate of the counter circuit based on the output of the speeding comparator in order to converge the cathode current to the predetermined value.

13. The circuit of claim 10, wherein the counter circuit comprises a 9-bit up/down counter, and further wherein the digital-to-analog converter comprises a 9-bit digital-to-analog converter.

14. A digital cut-off control loop circuit for television and video display control, comprising:
    a display driver current sensor;
    an up/down counter circuit having an input coupled to the display driver current sensor and an output;
    an analog output circuit having an input coupled to the output of the up/down counter and an output coupled to control the display driver current;

a speeding comparator comprising a plurality of comparator circuits each having an input coupled in parallel with the display driver current sensor and configured to determine and output a measure of the difference between a sensed display driver current and a predetermined value;

a speeding logic circuit having an input coupled to an output of the speeding comparator and having an output coupled to a further input of the up/down counter circuit for controlling a counting rate of the up/down counter circuit according to a measure of a difference between the display driver current and the predetermined value;

a current reference circuit comprising a comparator having a first input coupled to the display driver current sensor and a second input coupled to a leak voltage reference source and an output coupled to a capacitor; and a warm-up circuit comprising a comparator having a first input coupled to the display driver current sensor and a second input coupled to a starting voltage source.

15. The circuit of claim 14, wherein the speeding logic circuit is configured to generate a control signal while the display driver current is substantially different from the predetermined value.

16. The circuit of claim 14, wherein the speeding comparator comprises a plurality of outputs including a convergent output and at least one upper output and lower output, and wherein the convergent output corresponds to the display driver current being substantially equal to the predetermined value, and the upper and lower outputs are utilised by the speeding logic circuit to determine the up/down counting rate of the counter circuit, respectively.

17. An RGB control circuit for use in television/video display control, comprising:

a display driver current sensor;

a 9-bit counter circuit and 9-bit analog output circuit coupled to control the display driver current;

a speeding comparator having a plurality of comparator circuits coupled in parallel with the display driver current sensor as input, for determining and outputting a measure of the difference between the sensed display driver current and a predetermined value thereof; and a speeding logic circuit coupled to the speeding comparator and counter circuit, and arranged to control the up/down counting rate of the counter circuit according to said measure of difference in display driver current, wherein the counter circuit and the analog output circuit are both 9-bit circuits.

18. An RGB control circuit for use in television and video display control, comprising:

an up/down 9-bit counter circuit configured to receive a display driver current and to generate a digital output signal in response thereto;

a 9-bit digital-to-analog converter having an input coupled to an output of the counter circuit and configured to receive the digital output signal from the counter circuit and to output an analog control signal;

a speeding comparator circuit comprising a plurality of comparators, each comparator having an input coupled in parallel with the other comparator circuits to a cathode current output for determining and outputting a measure of a difference between the cathode current output and a predetermined value; and a speeding logic circuit having an input coupled to an output of the speeding comparator circuit and further having a first output coupled to the counter circuit, the speeding logic circuit configured to control the counting rate of the counter circuit according to a measure of a difference between the cathode current and the predetermined value to provide a variable up counting rate and a variable down counting rate, wherein the counter circuit comprises a 9-bit up/down counter, and further wherein the digital-to-analog converter comprises a 9-bit digital-to-analog converter.

* * * * *